US009786284B2

(12) United States Patent
Acero et al.

(10) Patent No.: US 9,786,284 B2
(45) Date of Patent: *Oct. 10, 2017

(54) DUAL-BAND SPEECH ENCODING AND ESTIMATING A NARROWBAND SPEECH FEATURE FROM A WIDEBAND SPEECH FEATURE (71) Applicant: Microsoft Technology Licensing, LLC, Redmond, WA (US)

(72) Inventors: Alejandro Acero, Bellevue, WA (US); James G. Droppo, III, Carnation, WA (US); Michael L. Seltzer, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 31 days.

This patent is subject to a terminal disclaimer.

(21) Appl. No.: 14/459,973

(22) Filed: Aug. 14, 2014

(65) Prior Publication Data

US 2014/0358525 A1 Dec. 4, 2014

Related U.S. Application Data (63) Continuation of application No. 12/978,197, filed on Dec. 23, 2010, now Pat. No. 8,818,797.

(51) Int. Cl.
| G10L 19/02 | (2013.01) |
| G10L 19/005 | (2013.01) |
| G10L 15/02 | (2006.01) |
| G10L 19/20 | (2013.01) |
| G10L 21/038 | (2013.01) |
| G10L 19/00 | (2013.01) |

(52) U.S. Cl.
CPC ............ *G10L 19/005* (2013.01); *G10L 15/02* (2013.01); *G10L 19/20* (2013.01); *G10L 21/038* (2013.01); *G10L 2019/0001* (2013.01)

(58) Field of Classification Search
CPC ..... G10L 19/00; G10L 19/02; G10L 19/0208; G10L 19/16; G10L 19/18
USPC ........................................................ 704/205
See application file for complete search history.

(56) References Cited

U.S. PATENT DOCUMENTS

| 6,335,927 B1 * | 1/2002 | Elliott et al. .................. 370/352 |
| 6,532,446 B1 * | 3/2003 | King .......................... 704/270.1 |

(Continued)

FOREIGN PATENT DOCUMENTS

| CN | 1381041 | 11/2002 |
| CN | 1496559 | 5/2004 |

OTHER PUBLICATIONS

"Foreign Office Action", CN Application No. 201110435771.X, dated Dec. 25, 2013, 11 Pages.

(Continued)

*Primary Examiner* — Michael N Opsasnick (57) ABSTRACT

This document describes various techniques for dual-band speech encoding. In some embodiments, a first type of speech feature is received from a remote entity, an estimate of a second type of speech feature is determined based on the first type of speech feature, the estimate of the second type of speech feature is provided to a speech recognizer, speech-recognition results based on the estimate of the second type of speech feature are received from the speech recognizer, and the speech-recognition results are transmitted to the remote entity.

20 Claims, 5 Drawing Sheets

(56) References Cited

U.S. PATENT DOCUMENTS

| | | | |
|---|---|---|---|
| 6,633,940 B1* | 10/2003 | Alasti et al. | 710/262 |
| 6,760,699 B1* | 7/2004 | Weerackody et al. | 704/233 |
| 6,993,483 B1 | 1/2006 | Milner | |
| 7,599,834 B2 | 10/2009 | Raad et al. | |
| 8,818,797 B2* | 8/2014 | Acero et al. | 704/205 |
| 2002/0018490 A1* | 2/2002 | Abrahamsson et al. | 370/477 |
| 2003/0016796 A1* | 1/2003 | Hinderks | 379/93.31 |
| 2004/0243400 A1 | 12/2004 | Klinke | |
| 2006/0080105 A1 | 4/2006 | Lee et al. | |
| 2006/0178871 A1* | 8/2006 | Seltzer et al. | 704/205 |
| 2006/0178875 A1* | 8/2006 | Seltzer et al. | 704/222 |
| 2007/0055519 A1 | 3/2007 | Seltzer et al. | |
| 2008/0059166 A1 | 3/2008 | Ehara | |
| 2008/0300866 A1 | 12/2008 | Mukhtar et al. | |
| 2010/0036658 A1 | 2/2010 | Son et al. | |
| 2010/0057476 A1 | 3/2010 | Sudo et al. | |
| 2010/0161332 A1* | 6/2010 | Seltzer et al. | 704/244 |
| 2012/0166186 A1 | 6/2012 | Acero | |

OTHER PUBLICATIONS

"Non-Final Office Action", U.S. Appl. No. 12/978,197, dated Oct. 3, 2013, 8 pages.

"Notice of Allowance", U.S. Appl. No. 12/978,197, dated Apr. 23, 2014, 7 pages.

"Supplemental Notice of Allowance", U.S. Appl. No. 12/978,197, dated Jun. 16, 2014, 2 pages.

Miet "Towards Wideband Speech by Narrowband Speech Bandwidth Extension: Magic Effect or Wideband Recovery?", Thesis, De L'Universite Du Maine, Available at <http://cyberdoc.univ-lemans.fr/theses/2001/2001LEMA1014.pdf>,Nov. 30, 2001, 132 pages.

Seltzer, et al., "Training Wideband Acoustic Models Using Mixed-Bandwidth Training Data Via Feature Bandwidth Extension", In Proceedings of ICASSP 2005, Available at <http://citeseerx.ist.psu.edu/viewdoc/download?doi=10.1.1.121.3047&rep=rep1&type=pdf>,2005, pp. I-921-I-924.

Shao, "Robust Algorithms for Speech Reconstruction on Mobile Devices", Thesis, Speech Group, School of Computing Sciences, University of East Anglia, England, Available at <http://citeseerx.ist.psu.edu/viewdoc/download?doi=10.1.1.64.2173&rep=rep1&type=pdf>,Feb. 2005, 194 pages.

Vary, et al., "Steganographic Wideband Telephony Using Narrowband Speech Codecs", In Proceedings of ACSSC 2007, Available at <http://www.ind.rwth-aachen.de/fileadmin/publications/vary07.pdf>,Nov. 2007, pp. 1475-1479.

"Foreign Office Action", CN Application No. 201110435771.X, dated Sep. 3, 2014, 8 pages.

"Foreign Notice of Allowance", CN Application No. 201110435771.X, dated Mar. 31, 2015, 4 Pages.

* cited by examiner

DUAL-BAND SPEECH ENCODING AND ESTIMATING A NARROWBAND SPEECH FEATURE FROM A WIDEBAND SPEECH FEATURE

PRIORITY APPLICATION

This application claims priority under 35 U.S.C. §120 to U.S. patent application Ser. No. 12/978,197, entitled "Dual-Band Speech Encoding" and filed on Dec. 23, 2010, the disclosure of which is incorporated in its entirety by reference herein.

BACKGROUND

Telephony-based speech-recognition systems rely on training data to recognize speech signals. Performance of a speech-recognition system is limited by the quality (e.g. sampling-rate) of the training data available to the system. Legacy voice-based telephony systems produced narrowband training data due to low sampling-rate voice encoding and bandwidth-restricted voice-channels used for data collection. Current data-channel voice recognition systems have been designed around and deployed using this narrowband training data and therefore receive narrowband speech data. Thus, currently deployed narrowband voice recognition systems are often unable to collect wideband speech data necessary to deploy higher-quality wideband speech-recognition systems.

SUMMARY

This document describes various techniques for implementing dual-band speech encoding in speech-recognition systems. These techniques may determine an estimate of a speech feature based on another type of speech feature and a speech feature estimation error. Once determined, the techniques use the estimate of the speech feature to provide a speech-based service and store the other of type speech feature. By so doing, these techniques conserve bandwidth by providing dual-band speech-based functionalities such as, narrowband speech-based service and wideband speech data collection, while communicating single-band speech features.

This Summary is provided to introduce a selection of concepts in a simplified form that are further described below in the Detailed Description. This Summary is not intended to identify key or essential features of the claimed subject matter, nor is it intended to be used as an aid in determining the scope of the claimed subject matter.

BRIEF DESCRIPTION OF THE DRAWINGS

The detailed description is described with reference to the accompanying figures. In the figures, the left-most digit of a reference number identifies the figure in which the reference number first appears. The use of the same reference number in different instances in the description and the figures may indicate similar or identical items.

DETAILED DESCRIPTION

Overview

This document describes various techniques for dual-band speech encoding. Various embodiments of these techniques allow a distributed speech-recognition system to provide services using speech-recognition based on one type of speech features using speech features of another type. In some embodiments, wideband and narrowband speech features can be communicated with a single encoded bit-stream containing the wideband speech features. Bandwidth is conserved by estimating narrowband speech features from wideband speech features, which may be stored to implement wideband speech-recognition services.

By way of example, consider a user of a smart phone making a search request via a speech-based service. Although the speech-based service may not be capable of using wideband speech features for speech recognition, the smart phone captures a waveform based on the user's voice and extracts higher-quality wideband speech features. The smart phone then transmits the extracted wideband speech features to a server of the speech-based service for speech-recognition.

The server estimates narrowband speech features from the wideband speech features and provides narrowband speech feature estimates to a narrowband speech recognizer. Results from the narrowband speech recognizer are sent to a search engine and the search results are transmitted to the smart phone. The higher-quality wideband speech features are stored by the server as training data to implement a higher-quality speech-based service once a sufficient amount of wideband speech data is collected. By so doing, search results based on narrowband speech features are provided to the user and wideband speech features are collected without transmitting both narrowband and wideband speech features conserving bandwidth that would be consumed by transmitting both sets of speech features.

Example Environment

Figure 1:
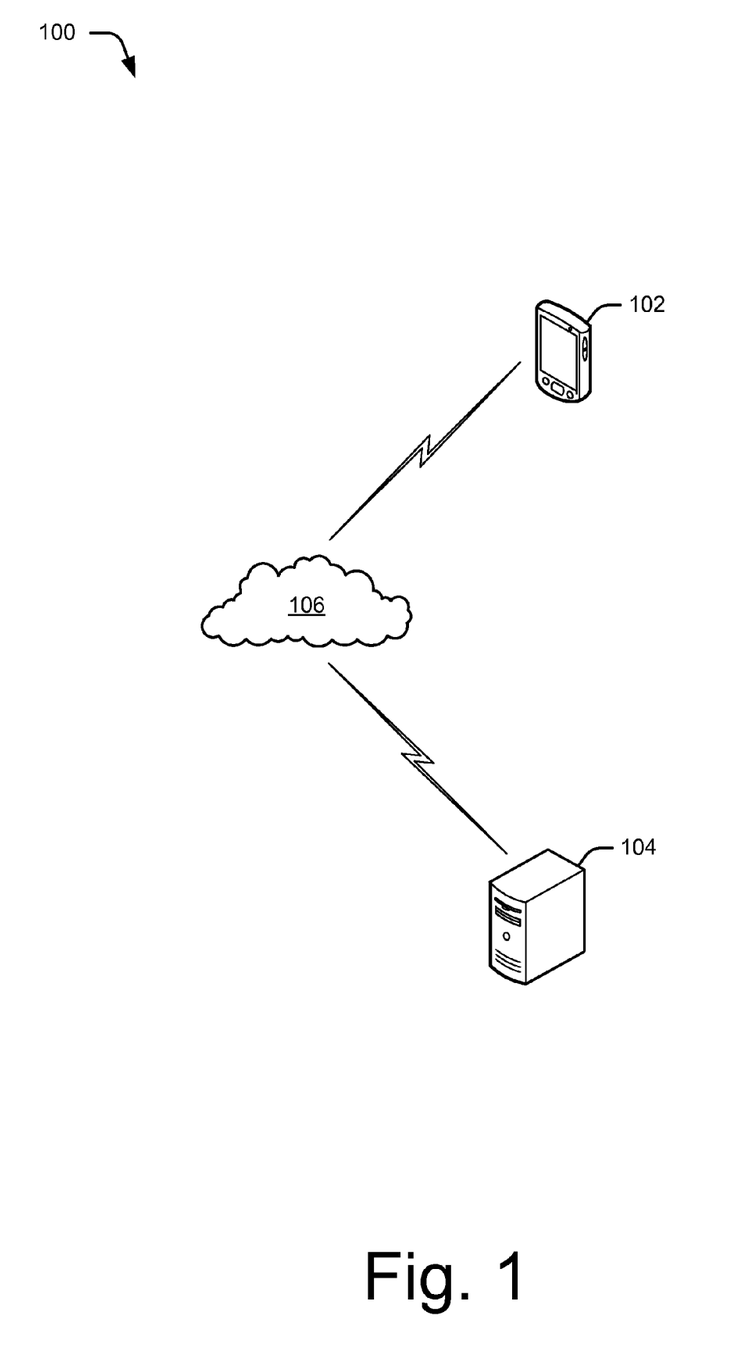
FIG. 1 illustrates an example environment in which techniques for dual-band speech encoding may be performed.

FIG. 1 is an illustration of an example environment 100 having a mobile device 102, server 104, and communication network 106, through which mobile device 102 and server 104 may communicate. Generally, mobile device 102 and server 104 communicate over data channels of wireless network 106 for implementing a distributed speech-recognition system. In some embodiments, wireless network 106 may also provide voice channels allowing mobile device 102 to communicate with other voice-enabled devices.

Mobile device 102 can be any device capable of receiving speech input and communicating data over a network (e.g., communication network 106). Mobile device 102 is a distributed speech-recognition system client and transmits speech data to server 104 for recognition. In the present example, mobile device 102 is illustrated as a smart-phone. While not shown, mobile device 102 may comprise other devices, such as a cellular phone, data-enabled navigation device (personal or vehicle-based), a wireless Voice-over-IP phone, data-enabled laptop or tablet computer, or a voice-enabled personal media device, to name a few.

Server 104 can be any computing device having resources and/or hosting services for recognizing speech. Server 104 is also capable of providing speech related services and/or results based on recognized speech for implementing a distributed speech-recognition system. Encoded speech features are decoded by server 104 prior to speech-recognition. In some embodiments, server 104 represents services and/or functionalities provided by the cloud or other remote speech-based service providers.

Server 104 has access to, either locally or remotely, data useful for speech-recognition such as, for example, narrowband speech data for training a speech recognizer. A codec of server 104 (not shown) may be useful for providing wideband and narrowband speech features from a single bit-stream of encoded wideband speech features. By receiving and/or storing wideband speech data, server 104 may collect wideband speech data for implementing a wideband speech-recognition system.

Wireless network 106 may include any suitable network such as a cellular network, a wireless local-area network, a wireless wide-area network, and/or a short range wireless-network, to name a few. Additionally, in at least some instances, wireless network 106 may be managed by a communication service provider, such as a cellular service provider, Internet service provider, and/or Voice-over-IP provider in order to facilitate data and/or voice communication for any type of wireless mobile device.

Figure 2:
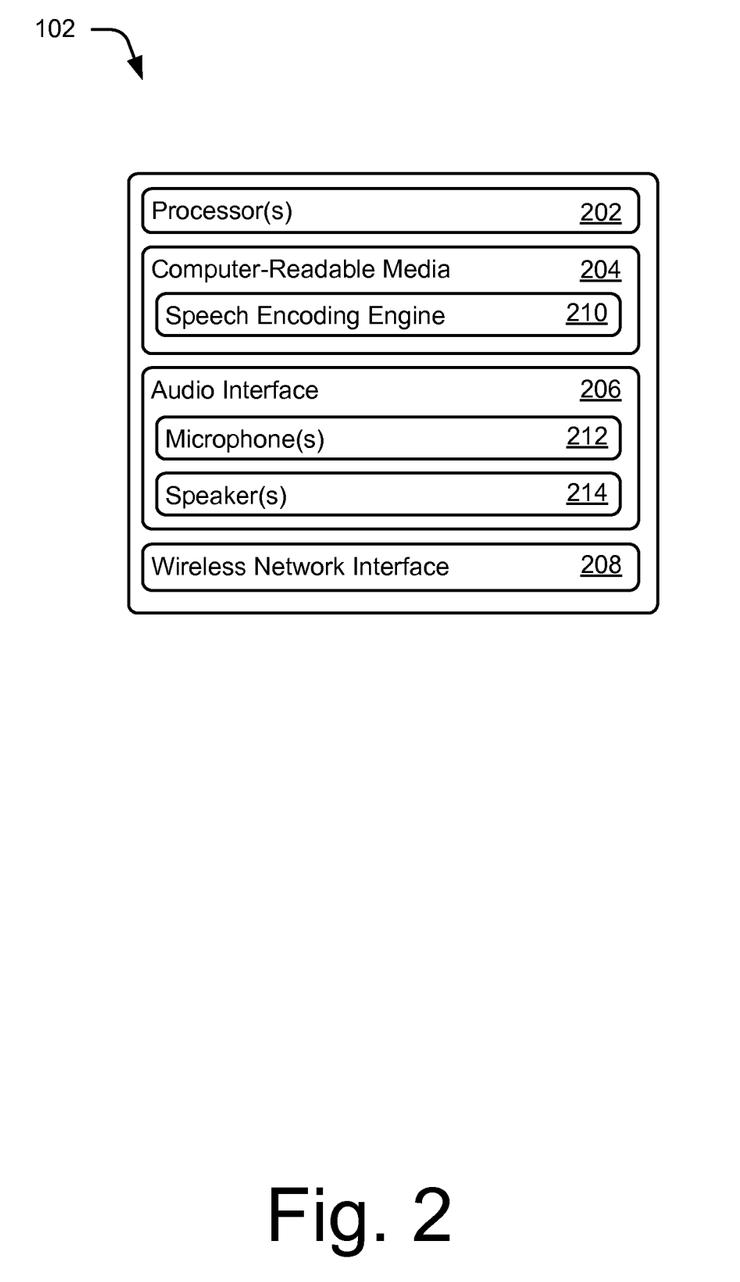
FIG. 2 illustrates a detailed example of the mobile device of FIG. 1.

FIG. 2 illustrates a detailed example of mobile device 102 of FIG. 1. Mobile device 102 includes processor(s) 202, computer-readable media (CRM) 204, audio interface 206, and wireless network interface 208. Computer-readable media 204 contains speech encoding engine 210. How speech encoding engine 210 is implemented and used varies, and is described as part of the processes discussed below. Audio interface 206 includes microphone(s) 212 capable of capturing audio and speaker(s) 214 capable of generating audible output. Audio interface 206 may be implemented natively on mobile device 102 and/or via any wired or wireless audio device such as wireless personal-area-network ear piece or headset.

Generally, any of the techniques and abilities described herein can be implemented using software, firmware, hardware (e.g., fixed-logic circuitry), manual processing, or any suitable combination of these implementations. The example mobile device 102 generally represents software, firmware, hardware, or any combination thereof. In the case of a software implementation, for instance, speech encoding engine 210 represents computer-executable instructions (e.g., program code) that perform specific tasks when executed on a processor (e.g., CPU or CPUs). The program code can be stored in one or more computer-readable memory devices, such as computer-readable media 204. The features and techniques described herein are platform-independent, meaning that they may be implemented on a variety of commercial computing platforms having a variety of processors.

Example Processes

The following discussion describes techniques for dual-band speech encoding. Generally, these techniques enable a mobile device to determine a first type of speech feature and a second type of speech feature based on a speech waveform, determine an estimate of the second type of speech feature based on the first type of speech feature, determine an estimation error of the estimate of the second type of speech feature and transmit the first type of speech feature and estimation error to a server. The techniques also allow a server to receive the first type of speech feature, determine as estimate of the second type of speech feature from the first type of speech feature, provide the estimate of the second type of speech feature to a speech recognizer trained using the second type of speech features, and transmit data associated with results of the speech recognizer to the mobile device.

Aspects of these processes may be implemented in hardware, firmware, software, or a combination thereof. For example, a speech-based coder-decoder (codec) can perform one or more aspects of these processes. These processes are shown as sets of blocks that specify operations performed, such as through one or more entities or devices, and are not necessarily limited to the order shown for performing the operations by the respective blocks. In portions of the following discussion reference may be made to environment 100 of FIG. 1 as well as entities of environment 100 illustrated in FIG. 2.

Figure 3:
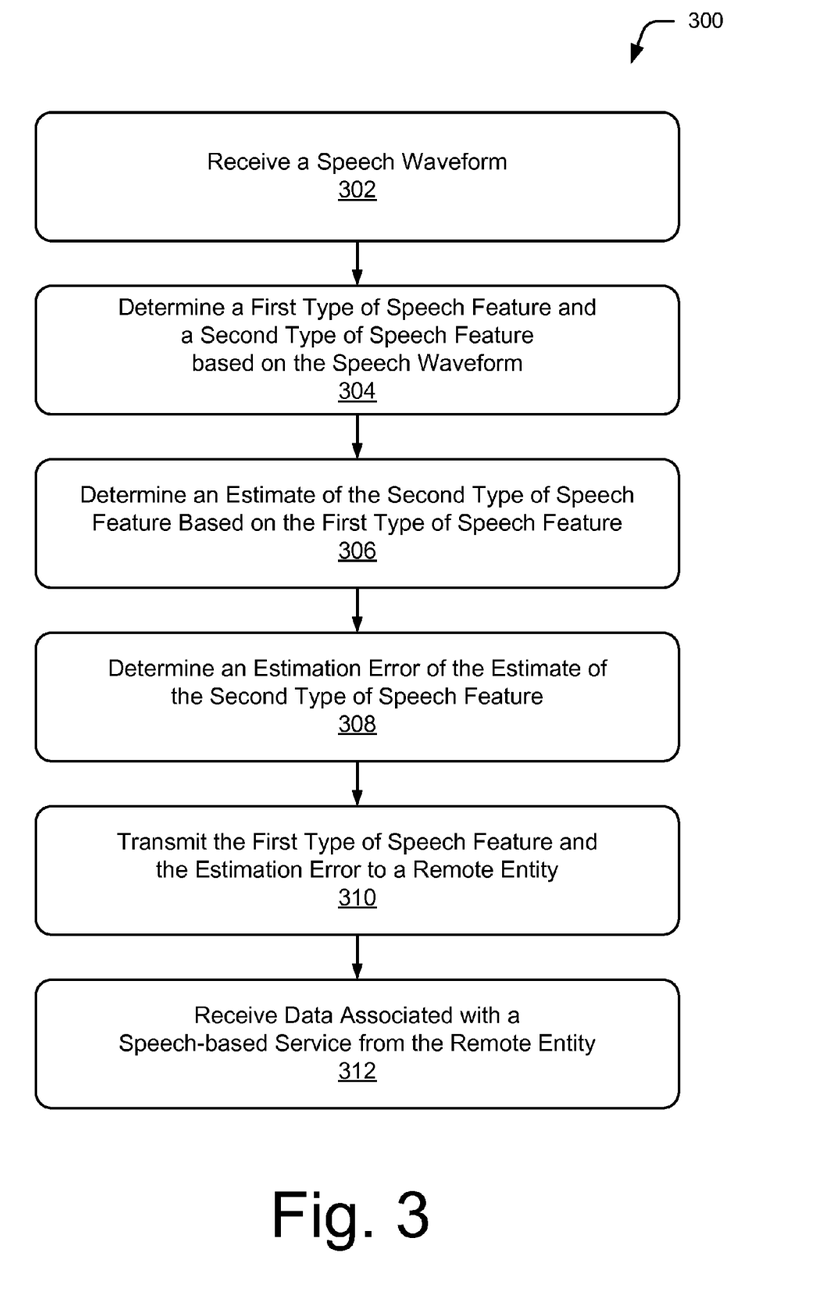
FIG. 3 is a flow diagram depicting an example process for determining an estimate of a speech feature based on another type of speech feature.

FIG. 3 is a flow diagram depicting an example process 300 for determining an estimate of a speech feature estimate based on another type of speech feature. Block 302 receives a speech waveform. The speech waveform may be received via an acoustic input such as a microphone having bandwidth of at least 7 kHz. By way of example, consider process 300 in the context of environment 100. Mobile device 102 receives a wideband speech waveform from a user via microphone. Assume that the waveform is a search request for nearby restaurants.

Block 304 determines a first type of speech feature and a second type of speech feature based on the speech waveform. In one example, a speech waveform is broken into speech frames at an interval providing a speech frame overlap from 40% to 60%. For example, 25 millisecond speech frames provided every 10 milliseconds provide about a 40% speech frame overlap. Speech features are extracted from a speech frame by calculating frame-based spectral estimates such as, for example, mel-frequency cepstral coefficients (MFCC), over a range of frequencies.

In some cases, wideband and narrowband wideband speech features are extracted from a given frame. A mel-filter bank can be configured to provide a wideband or narrowband speech features (e.g. MFCCs). In one example configuration, 22 narrowband speech features are extracted over about 4 kHz of the speech frame and 24 wideband speech features are extracted over about 7 kHz of the speech frame. Extracting and maintaining all 24 wideband MFCCs creates a precise spectral estimate for further processing.

Although a different number of speech features can be calculated for each band, the speech features of the different bands do not vary by more than an order of magnitude. Continuing the present example, speech encoding engine 210 breaks the speech waveform into 25 ms speech frames every 10 ms and extracts narrowband and wideband speech features from the 25 ms speech frames.

Block 306 determines an estimate of the second type of speech feature based the first type of speech feature. For instance, a narrowband speech feature estimate can be determined based on a wideband speech feature. The narrowband speech feature estimate may be determined using a transform, such as an affine transform. An affine transform matrix can be configured to determine a set of narrowband speech feature estimates from a set of wideband speech features. For example, using 24 wideband speech features, a 22×24 parameter matrix yields 22 narrowband speech feature estimates. Parameters of the affine transform are configured to minimize an estimation error associated with each narrowband speech feature estimate. The parameters of the transform can be determined using any suitable model such as, for example, minimizing mean square error (MMSE).

In an MMSE model, a set of parallel training data including wideband and narrowband speech features is created from a set of wideband speech data. Narrowband speech feature estimates are calculated from the wideband speech features using an affine transform. An estimation error is determined by comparing the narrowband speech feature estimates with the narrowband speech features. Parameters of the affine transform are selected to minimize the estimation error, or energy difference, associated with the narrowband speech feature estimates.

In other cases, narrowband speech feature estimates are determined using a pseudo-inverse derivation model. In a pseudo-inverse derivation model an approximate pseudo-inverse of a formulae for computing the wideband features from the frame-based spectral estimates is found. This spectral estimate formulate is then processed by a narrowband feature extractor to produce a narrowband speech feature estimate.

Continuing the present example, speech encoding engine 210 determines a narrowband speech feature estimate based on an extracted wideband speech feature using an affine transform. Assume that parameters of the transform are based on MMSE, minimizing an error associated with the narrowband speech feature estimate.

Block 308 determines an estimation error of the estimate of the second type of speech feature. In some cases, an estimation error is determined for narrowband speech feature estimate that is based on a wideband speech feature. The estimation error is determined using the narrowband speech feature estimate and an extracted narrowband speech feature. In some instances, the estimation error is equivalent to an energy difference between the narrowband speech feature estimate and the extracted narrowband speech feature. The estimation error is useful to a remote entity for determining another set narrowband speech feature estimates from wideband speech features.

In the context of the present example, speech encoding engine 210 determines an estimation error of the narrowband speech feature estimate by finding an energy difference between the narrowband speech feature estimate and the extracted narrowband speech feature. Assume here that speech encoding engine 210 stores the estimation error as a floating point number.

Block 310 transmits the first type of speech feature to a remote entity. Prior to transmission, the first type of speech features are encoded for a data-channel. In some cases, the first type of speech features are encoded using codebook-free encoding. Speech features based on speech not considered when designing and deploying a speech-recognition system can result in high and/or varying amounts of estimation error. Codebook-free encoding efficiently encodes these high and/or varying amounts of estimation error, which can render codebook-based encoding inefficient. Additionally, codebook-free encoding frees up valuable memory space of clients usually reserved for storing encoding related codebooks.

Adaptive differential pulse-code modulation offers efficient codebook-free encoding for the first type of speech features. A quantization step size of adaptive differential pulse-code modulation is dynamically adjusted based on a two-stage lookup table containing historical data of encoded values. Additionally, applying dynamic mean normalization and/or temporally de-correlating wideband speech features can further improve encoding results.

In some embodiments, block 310 may also transmit the estimation error of the estimate of the second type of speech feature with the wideband speech feature. Prior to transmitting the estimation error, bandwidth availability may be determined to ensure successful transmission of the estimation error. In such cases, the estimation error of the estimate of the second type of speech feature is also encoded using the techniques described above.

Continuing the present example, speech encoding engine 210 encodes the wideband speech feature and the floating point number representing the estimation error of the narrowband speech feature estimate. Speech encoding engine 210 then queries wireless interface 206 to determine if sufficient bandwidth is available to transmit the estimation error with the wideband speech feature.

Assume here that sufficient bandwidth is available to transmit both the wideband speech feature and the estimation error of the narrowband speech feature estimate. Speech encoding engine 210 transmits the wideband speech feature and the estimation error of the narrowband speech feature estimate via wireless network interface 206 to server 104 that provides speech-based search services.

Block 312 receives data associated with a speech-based service from the remote entity. The data associated with the speech-based service may be data related to any suitable type of service such as search, navigation, translation, or social networking, to name a few. Concluding the present example, mobile device 102 receives data associated with search results for nearby restaurants from server 104 including directions and reviews of the nearby restaurants.

The operations of blocks 302, 304, 306, 308, and 310 may be repeated, providing additional speech-based services based on the first type of speech features.

Figure 4:
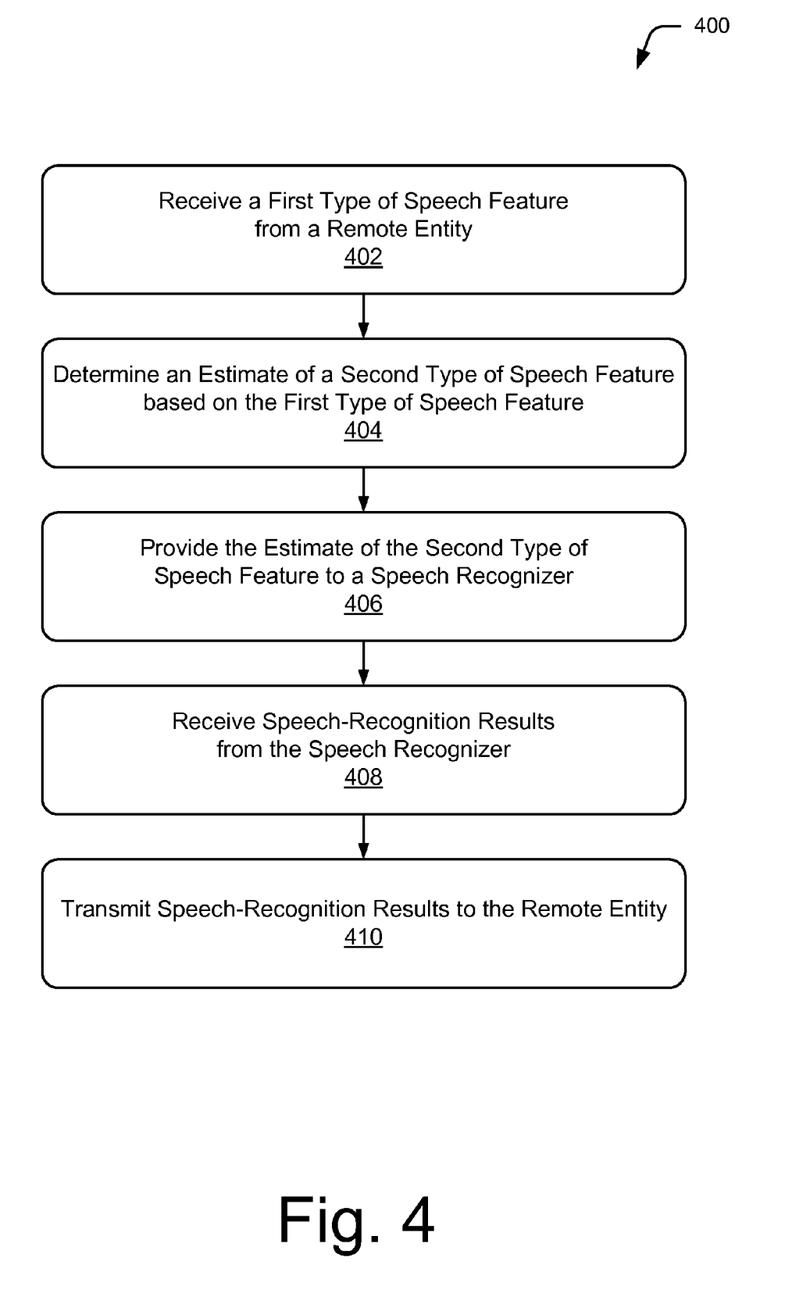
FIG. 4 is a flow diagram depicting an example process for determining an estimate of a speech feature based on a received speech feature of another type.

FIG. 4 is a flow diagram depicting an example process 400 for determining an estimate of a speech feature based on a received speech feature of another type. Block 402 receives a first type of speech feature from a remote entity, such as a wideband speech feature. Although not used directly for speech-recognition, the first type of speech feature can be stored to provide training data for wideband speech-recognition. In some cases, block 402 also decodes or decompresses a first type of speech feature that is encoded or compressed when received. For example, a wideband speech feature encoded with adaptive differential pulse-code modulation is decoded at block 402.

By way of example, consider process 400 in the context of the above-mentioned example. Here server 104 receives an encoded wideband speech feature from mobile device 102. Assume here that the wideband speech feature is associated with a search request for nearby coffee shops and is encoded with adaptive differential pulse-code modulation. In the context of the present example, server 104 also decodes the wideband speech feature by demodulating the adaptive differential pulse-code modulation.

Block 404 determines an estimate of a second type of speech feature based on the first type of speech feature. In some cases, the estimate of the second type of speech feature is an estimate of a narrowband speech feature. The estimate of the second type speech feature can be determined using the models described above, such as an MMSE based affine transform or pseudo-inverse derivation. The estimate of the second type of speech feature may be determined as part of an affine transform matrix useful for estimating an entire vector or matrix of speech features. The affine transform matrix may have asymmetrical parameters when estimating a reduced number of speech features from a full set of speech features of another type.

Determining an estimate of the second type of speech feature saves bandwidth by precluding the need to receive a second type of speech feature. Communicating both types of speech features consumes about twice the bandwidth of communicating one set of speech features. Continuing the ongoing example, server 104 determines a narrowband speech feature estimate by applying an affine transform to the wideband speech feature received from mobile device 102.

Block 406 provides the estimate of the second type of speech feature to a speech recognizer trained on the second type of speech features. The speech recognizer may be local or remote, and is capable of recognizing the second type of speech features. In some cases, the speech recognizer is associated with a specific type of service and capable of processing specific types of narrowband speech features. For instance, a speech recognizer associated with a translation service is capable of recognizing speech features from multiple languages and/or dialects.

Continuing the present example, assume that server 104 includes a local narrowband speech recognizer capable of recognizing the narrowband speech features. Server 104 provides the narrowband speech feature estimate to the local narrowband speech recognizer.

Block 408 receives speech-recognition results from the speech recognizer. The speech-recognition results are based on the estimate of the second type of speech feature. The speech-recognition results may be associated with any suitable speech-based service. In some cases, the speech-recognition results may be data for processing by a remote entity. In the context of the present example, server 104 receives speech-recognition results indicating a query for coffee shops near mobile device 102.

Block 410 transmits the speech-recognition results of the speech recognizer to the remote entity. The speech-recognition results can be encoded prior to transmission to the remote entity using any of the encoding techniques described above. In some cases, the results of the speech recognizer are provided to other services, such as search, navigation, or social networking, to name a few. After receiving a response from these other services, the response may also be transmitted to the remote entity.

Concluding the present example, server 104 provides results of the narrowband speech recognizer to a search engine. Assume here that server 104 receives a response from search engine including information relating to coffee shops near mobile device 102 including locations, menus, and pricing. Server 104 then transmits the search engine results including the information relating to the coffee shops to mobile device 102.

Figure 5:
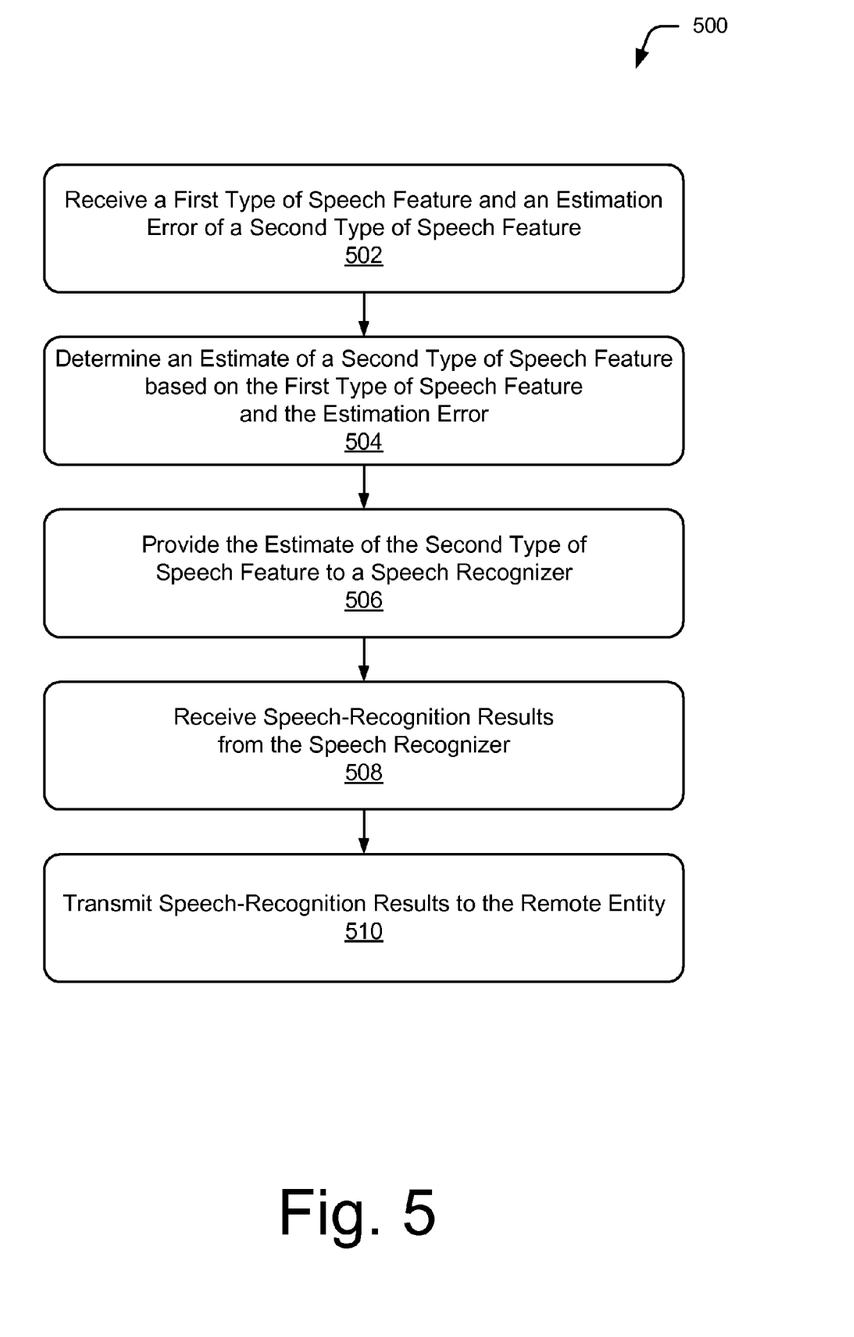
FIG. 5 is a flow diagram depicting an example process for determining an estimate of a speech feature estimate based on another type of speech feature and an estimation error.

FIG. 5 is a flow diagram depicting an example process 500 for determining an estimate of a speech feature estimate based on another type of speech feature and an estimation error. Block 502 receives a first type of speech feature and a second type of speech feature estimation error from a remote entity. In some cases, the first type of speech feature is a wideband speech feature and the second type of speech feature is an estimate error for a narrowband speech feature. Although not used directly for speech recognition, the first type of speech feature can be stored to provide training data for speech recognition based on the first type of speech features. In some cases, block 502 also decodes or decompresses a first type of speech feature and estimation error that are encoded or compressed when received. For example, a wideband speech feature and estimation error encoded with adaptive differential pulse-code modulation is decoded at block 502.

By way of example, consider process 500 in the context of the above-mentioned example. Assume that the wireless network interface 208 of mobile device 102 has bandwidth available to transmit a wideband speech feature and a narrowband speech feature estimation error. Server 104 receives the wideband speech feature and narrowband speech feature estimation error. Also assume that the wideband speech feature is related to a phrase translation request from a user of mobile device 102.

Block 504 determines an estimate of a second type of speech feature based on the first type of speech feature and the estimation error of the second type of speech feature. The estimate of the second type of speech feature can be determined using the models described above, such as MMSE based affine transform or pseudo-inverse derivation. The estimate of the second type of speech feature may be determined as part of an affine transform matrix. Additionally, using the estimation error when calculating the estimate of the second type of speech feature increases the accuracy of the estimation. In some cases, a narrowband speech feature estimate is determined based on a wideband speech feature and an estimation error of a narrowband speech feature estimate. Determining a narrowband speech feature estimate based on the wideband speech feature and the narrowband speech feature estimation error saves bandwidth by precluding the need to receive a separate narrowband speech feature.

Continuing the present example, server 104 determines a narrowband speech feature estimate by applying an affine transform to the wideband speech feature received from mobile device 102. Server 104 also includes the narrowband speech feature estimation error received from mobile device 102 in the affine transform to improve accuracy of the narrowband speech feature estimate.

Block 506 provides the estimate of the second type of speech feature to a speech recognizer trained on the second type of speech features. The speech recognizer may be local or remote, and is capable of recognizing the second type of speech features. Continuing the present example, assume that server 104 has access to a remote narrowband speech recognizer. Server 104 provides the narrowband speech feature estimate to the remote narrowband speech recognizer.

Block 508 receives speech-recognition results from the speech recognizer. The speech-recognition results are based on the estimate of the second type of speech features. The speech-recognition results may be associated with any suitable speech-based service. In some cases, the speech-recognition results may be data for processing by a remote entity. In the context of the present example, server 104 receives speech-recognition results indicating a user of mobile device 102 is requesting a phrase translation.

Block 510 transmits the speech recognition results of the speech recognizer to the remote entity. In some cases, the speech recognition results of the speech recognizer are provided to other services, such as search, navigation, translation, or social networking, to name a few. After receiving a response from these other services, the response may also be transmitted to the remote entity as any suitable data type such as text, coordinates, pictures, audio or video files, to name a few.

In the context of the present example, assume that server 104 provides the speech-recognition results to a service for translation. Also assume that server 104 receives translation results including text and audio related to the phrase translation requested by the user of mobile device 102 from the service. Concluding the present example, server 104 transmits the text and audio files to mobile device 102.

CONCLUSION

This document describes various techniques for dual-band speech encoding. By so doing, these techniques provide speech-based services based on one type of speech data while collecting another type of speech data. In some embodiments, narrowband speech features are estimated from wideband speech features thereby precluding the need to transmit both sets of speech features. Although the invention has been described in language specific to structural features and/or methodological acts, it is to be understood that the invention defined in the appended claims is not necessarily limited to the specific features or acts described. Rather, the specific features and acts are disclosed as example forms of implementing the claimed invention.

What is claimed is:

1. A computing device comprising:
   one or more computer processors;
   one or more computer-readable media having instructions stored thereon that, responsive to execution by the one or more computer processors, perform operations comprising:
      determining, based on one speech waveform, a wideband speech feature and a narrowband speech feature;
      determining, based on the wideband speech feature, an estimate of the narrowband speech feature;
      determining, based on the narrowband speech feature and the estimate of the narrowband speech feature, an estimation error of the estimate of the narrowband speech feature;
      transmitting the wideband speech feature and the estimation error to a remote entity;
      receiving, from the remote entity, data associated with a speech-based service based on the wideband speech feature; and
      outputting, by the computing device, speech recognition results for the one speech waveform based on the received data associated with the speech-based service.

2. A computing device as described in claim 1, wherein the operations further comprise determining if sufficient bandwidth is available to transmit the estimation error of the narrowband speech feature and, when the sufficient bandwidth is available, transmitting the estimation error of the narrowband speech feature estimate.

3. A computing device as described in claim 1, wherein the operations further comprise encoding the wideband speech feature or the estimation error of the narrowband speech feature estimate using codebook-free encoding.

4. A computing device as described in claim 1, wherein the operations further comprise determining the narrowband speech feature estimate uses an affine transform.

5. A computing device as described in claim 1, wherein the operations further comprise encoding the wideband speech feature or the estimation error of the narrowband speech feature estimate using adaptive differential pulse-code modulation.

6. A computing device as described in claim 1, wherein the operations further comprise encoding the wideband speech feature with dynamic mean normalization.

7. A computing device as described in claim 1, wherein the operations further comprise determining the wideband speech feature and the narrowband speech feature comprises breaking the one speech waveform into a plurality of overlapping speech frames and extracting the wideband speech feature and the narrowband speech feature from the plurality of overlapping speech frames.

8. A computing device as described in claim 1, wherein the operations further comprise determining a floating point number representing the estimation error of the narrowband speech feature and transmitting the estimation error to the remote entity comprises transmitting the floating point number representing the estimation error of the narrowband speech feature.

9. A computing device as described in claim 1, wherein the speech recognition results comprise text, coordinates, a picture, an audio file, or a video file for output or display on the computing device.

10. A computing device as described in claim 1, wherein the speech recognition results are further processed by search, navigation, translation, or social networking services prior to being received by the computing device.

11. A computing device as described in claim 1, wherein the operations further comprise receiving the one speech waveform by the computing device via one or more microphones included in an audio interface of the computing device.

12. A computing device as described in claim 11, wherein the one or more microphones each have a bandwidth of at least 7 kHz.

13. A computing device comprising:
   one or more computer processors;
   one or more computer-readable media having instructions stored thereon that, responsive to execution by the one or more computer processors, perform operations comprising:
      receiving, via a network interface of the computing device, a wideband speech feature from a remote entity;
      determining an estimate of a narrowband speech feature based on the wideband speech feature;
      providing the estimate of the narrowband speech feature to a speech recognizer trained on the narrowband speech features;
      receiving, from the speech recognizer, speech-recognition results based on the estimate of the narrowband speech feature;
      assembling the speech recognition results received from the speech recognizer; and
      transmitting, via the network interface to the remote entity and for output or display by the remote entity, the assembled speech-recognition results based on the estimate of the narrowband speech feature.

14. A computing device as described in claim 13, wherein the operations further comprise providing the speech-recognition results of the speech recognizer trained on narrowband speech features to a search engine, receiving search results from the search engine, and transmitting the search results to the remote entity.

15. A computing device as described in claim 13, wherein the operations further comprise storing the wideband speech feature for training a second speech recognizer based on wideband speech features.

16. A computing device as described in claim 13, wherein determining the estimate of the narrowband speech feature uses an affine transform.

17. A computing device as described in claim 16, wherein parameters of the affine transform are based on a parallel set of the wideband speech features and the narrowband speech features.

18. One or non-transitory computer-readable storage memories storing instructions that upon execution by a computing device, cause the computing device to perform operations comprising:
   receiving, from a remote entity, a wideband speech feature and an estimation error of a narrowband speech feature;

determining an estimate of a narrowband speech feature based on the wideband speech feature and the estimation error of the narrowband speech feature;

providing the estimate of the narrowband speech feature to a speech recognizer trained on narrowband speech features;

receiving, from the speech recognizer trained on narrowband speech features, speech-recognition results based on the estimate of the narrowband speech feature;

assembling the speech recognition results received from the speech recognizer; and transmitting, to the remote entity and for output or display by the remote entity, the assembled speech-recognition results based on the estimate of the narrowband speech feature.

19. One or more non-transitory computer-readable storage memories as described in claim 18, wherein determining the estimate of the narrowband speech feature uses a pseudo-inverse derivation model.

20. One or more non-transitory computer-readable storage memories as described in claim 18, wherein the operations further comprise storing the wideband speech feature for training a second speech recognizer based on the wideband speech feature.

* * * * *